United States Patent
Reyes et al.

(10) Patent No.: US 6,348,011 B1
(45) Date of Patent: Feb. 19, 2002

(54) TEXTURE COATING FOR GOLF CLUB

(75) Inventors: Herbert Reyes, Laguna Nigel; Wayne H. Byrne, Murrieta, both of CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/417,829

(22) Filed: Oct. 12, 1999

(51) Int. Cl.[7] .................. A63B 53/04; A63B 53/06; A63B 53/08; B32B 5/16; B05D 1/02

(52) U.S. Cl. .................. 473/324; 473/342; 473/349; 428/323; 427/421; 427/422

(58) Field of Search .................. 473/330, 324, 473/349, 342, 329, 353, 328; 427/421, 422; 428/323, 327

(56) References Cited

U.S. PATENT DOCUMENTS

| | | |
|---|---|---|
| 1,660,126 A | 2/1928 | Heeter |
| D138,437 S | 5/1944 | Link |
| D138,442 S | 8/1944 | Link |
| D172,459 S | 6/1954 | Beveridge |
| D180,602 S | 7/1957 | Karns |
| 2,934,347 A | 4/1960 | Siniscalchi |
| 2,954,231 A | 9/1960 | MacIntyre |
| 3,989,861 A | 11/1976 | Rasmussen |
| 4,241,115 A * | 12/1980 | Temin .................. 427/384 |
| D265,112 S | 6/1982 | Lyons, Jr. |
| 4,355,808 A | 10/1982 | Jernigan et al. |
| D268,357 S | 3/1983 | Mader |
| 4,676,508 A | 6/1987 | Dilny |
| D309,488 S | 7/1990 | Langert |
| 4,951,953 A * | 8/1990 | Kim .................. 273/80 B |
| 5,190,289 A | 3/1993 | Nagai et al. |
| 5,318,300 A | 6/1994 | Schmidt et al. |
| 5,337,670 A | 8/1994 | Huang |
| 5,354,056 A | 10/1994 | Cornish, III |
| 5,484,155 A * | 1/1996 | Yamawaki et al. ...... 273/164.1 |
| D371,817 S | 7/1996 | Olsavsky et al. |
| D379,391 S | 5/1997 | Moore |
| 5,743,812 A | 4/1998 | Card |
| D396,512 S | 7/1998 | Besnard et al. |
| D398,681 S | 9/1998 | Galy |
| D398,682 S | 9/1998 | Moore |
| 5,800,285 A | 9/1998 | Thorne et al. |
| D399,289 S | 10/1998 | Sheets et al. |
| 5,851,158 A | 12/1998 | Winrow et al. |
| 6,017,857 A * | 1/2000 | Heimann et al. ........... 508/136 |
| 6,088,947 A * | 7/2000 | Suzue et al. .................. 43/18.1 |

* cited by examiner

*Primary Examiner*—Paul T. Sewell
*Assistant Examiner*—Sneh Varma
(74) *Attorney, Agent, or Firm*—Michael A. Catania

(57) ABSTRACT

A texture coating for golf club heads provides a durable and aesthetically pleasing exterior for wood, iron or putter golf club heads. The texture coating is a combination of a medium material, resin particles and a coupling agent. In a preferred embodiment the medium is a paint, the resin particles are olefins, most preferably polyethylene or polypropylene, and the coupling agent is a silane compound.

3 Claims, 4 Drawing Sheets

TEXTURE COATING FOR GOLF CLUB

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a coating material for a golf club head. More specifically, the present invention relates to a texture coating exhibiting improved durability and aesthetic appearance on golf club head surfaces.

2. Description of the Related Art

A coating applied to a golf club head can provide various functional and aesthetic properties not available from structural material of the golf club head. Included among these functional characteristics are environmental protection from sun, moisture and oxidation, in addition to performance enhancements including high and low friction surfaces to promote desired spin rate of a golf ball, improved aerodynamics and wear resistance. Aesthetic properties such as texture, color and surface finish play a significant role in overall appearance and consumer acceptance of a complete golf club.

A sole or bottom of the golf club head is exposed to ground contact during the striking of a golf ball, and high frictional forces encountered during ground contact require the bottom of the golf club be constructed of a highly durable material, such as stainless steel or titanium metal. While the metal surfaces have the requisite durability, functional and aesthetic properties are limited to those inherit properties of the metal material. Many inventors have incorporated coatings on golf clubs to enhance functional and aesthetic properties, as disclosed in the following examples.

One example is that of Winrow, et al., U.S. Pat. No. 5,851,158, discussing a high durability coating applied to a golf club head using a powder coating containing carbides, borides, nitrides or oxides. This powder coating process employs a supersonic gas velocity to apply the coating and vary one or more of: the club head weight location, loft of the striking face, hardness, surface texture, and deflection and spin rate of a golf ball upon impact with the striking face.

Another example is supplied by Card, U.S. Pat. No. 5,743,812, where a low friction polytetrafluoroethylene coating is applied to the striking face of the golf club head to reduce spin rate and increase distance of the golf ball upon impact with the striking face.

Yet another example is that of Yamawaki et al., U.S. Pat. No. 5,484,155, wherein a golf club head contains an aesthetic paint coating. However, the bottom of the golf club, which experiences the highest frictional forces, contains no paint in the highest wear portions.

Another purpose for coating is found in Cornish, U.S. Pat. No. 5,354,056, to minimize air resistance of the golf club head by utilizing a coating material to produce a rough surface finish. Sand may be mixed with glue to provide this rough surface finish providing resultant improvements in aerodynamics of the golf club.

A further example of reducing air resistance is provided by Nagai et al., U.S. Pat. No. 5,190,289 disclosing a coating around the periphery of a golf club head to produce a roughened surface. This coating reduces air resistance of the golf club during the golf swing and therefore provides higher club head velocity to impact the golf ball.

A further example of coating a golf club head is found in Kim, U.S. Pat. No. 4,951,953, where a diamond coating provides improved strength to the striking face of the golf club head, resulting in improved travel distance of the golf ball upon impact with the striking face.

Another example of coating a golf club head is provided by Temin, U.S. Pat. No. 4,241,115, where a wood golf club head is coated with a resin solution to render the wood impervious to moisture, resistant to damage from abrasives, shock and impact forces.

One more example of coating a golf club head is that of Rasmussen, U.S. Pat. No. 3,989,861, using abrasive particles in a soluble adhesive, applied to the striking face of the golf club head to increase the spin rate of a golf ball upon impact with the striking face. Suitable abrasives include sand, emory, powdered granite, pumice, boron carbide and aluminum oxide.

While the previously discussed coating examples exhibit various functional and aesthetic properties for golf clubs, a need still exists for a low cost coating to provide high durability in conjunction with improved aesthetics.

BRIEF SUMMARY OF THE INVENTION

The present invention comprises a texture coating with improved durability and aesthetic properties for golf clubs. In a preferred embodiment a mixture of a polymeric resin particles, a coupling agent and a medium are applied to a golf club head followed by a drying step to form the texture coating. Increased durability results from deformation of the resin particles when exposed to impact or shear forces. In other words, the resin particles absorb energy by deforming and thereby protecting the aesthetic properties of the medium. The polymeric resin is selected from thermoset or thermoplastic resins, with thermoplastics such as polyethylene or polypropylene being a preferred embodiment. Possible shapes for the polymeric resin particles are not limited, but a preferably smooth surface helps to distribute the particles uniformly throughout the medium with a most preferred embodiment having a spherical shape with a diameter of less than 50 microns, most preferably 18–50 microns. Pigments can be incorporated into the polymeric resin particles to augment or contrast the coloring of the medium.

The coupling agents of the present invention help bind the polymeric resin particles and the medium to a surface of the golf club head. Preferred embodiments of the coupling agent include silane and inorganic acids.

The medium can be selected from any number of formulations, with paints being a preferred embodiment. Preferred paint embodiments for the medium include thermosetting polyamides and urethanes.

Additional additives can be incorporated into the texture coating, examples include ultraviolet (UV) stabilizers, color enhancers, antioxidants, moisture inhibitors, fluorescent or luminescent compounds and the like. One method for authenticating the golf club head of the present invention is to imprint a distinctive mark on the texture coating using the fluorescent or luminescent additive. Under natural light the mark is invisible but appears when exposed to light of a specified range of wavelengths. This same effect can be obtained by mixing the fluorescent or luminescent into the texture coating before application to the golf club head.

One object of the present invention is to improve durability of coatings applied to a golf club head.

Another object is to protect a non-durable first coating with a durable second coating on a golf club head.

A further object of the invention is producing a semi-gloss finish to the surface of a golf club head which will resist marring during incidental impact with other objects.

Another object of the invention is to help identify authentic golf clubs by applying a coating containing a fluorescent or a luminescent additive.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Like numbers are used throughout the detailed description to designate corresponding parts of a golf club head and a texture coating of the present invention.

Figure 1:
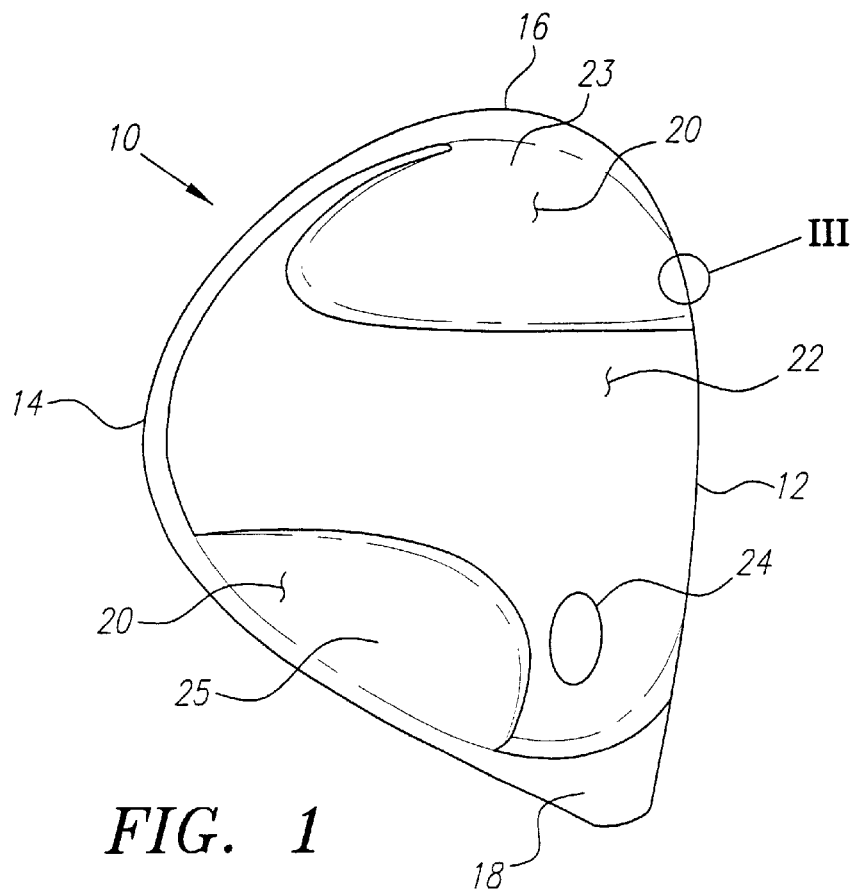
FIG. 1 is a bottom view of a wood golf club head showing an embodiment of a texture coating of the present invention.
Figure 2:
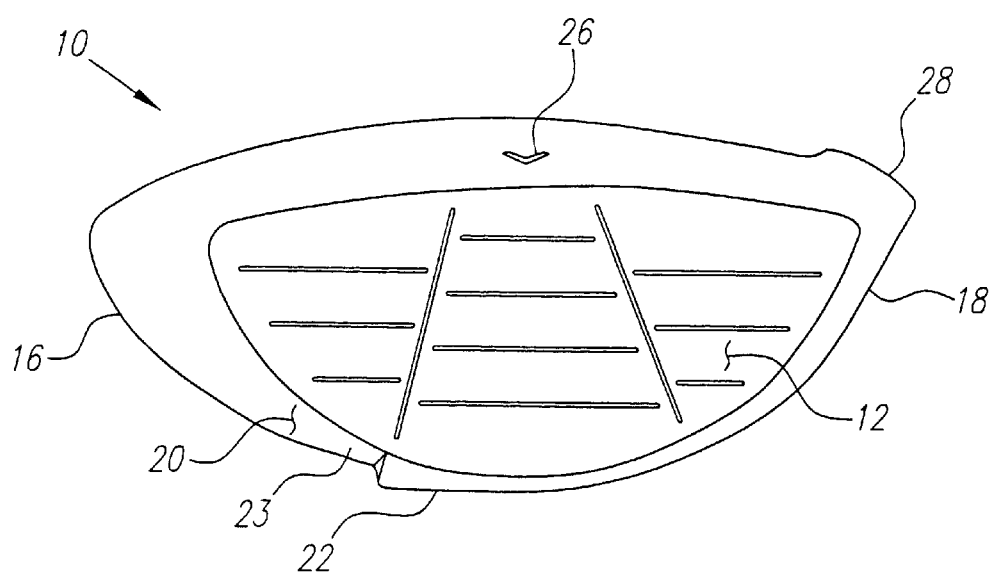
FIG. 2 is a front perspective view of the wood golf club head showing an embodiment of the texture coating of the present invention.

As shown in FIGS. 1 and 2 a wood-type golf club head 10 comprises a texture coating 20 of the present invention. The wood-type golf club head 10 further comprises a face region 12 for striking a golf ball (not shown), a rear region 14, a toe region 16, a heel region 18, a bottom is region 22, a top region 24 and a hosel inlet 26 for accepting a golf shaft (not shown). Structural material for the wood-type golf club head can be selected from metals and non-metals, with metals such as stainless steel and titanium being preferred embodiments. The bottom region 22 is a convex surface defining a first level, in a preferred embodiment a second level 23 is located in the toe region 16, and a third level 25 is located in the heel region 18. In a most preferred embodiment the top region 24 is coated with paint and the second and third levels, 23 and 25 respectively, are covered with the texture coating 20. The face, rear, toe, heel, top and bottom regions, 12, 14, 16, 18, 24 and 22 respectively, are meant to describe general sections of the golf club head 12 and may overlap one another.

Figure 3A:
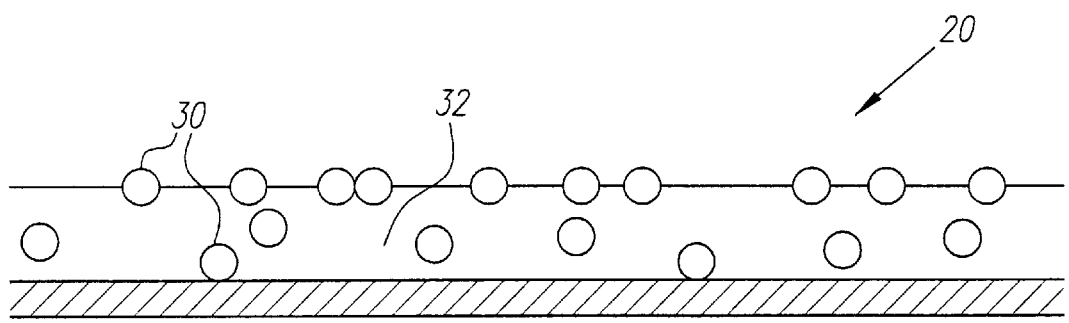
FIG. 3A is a cross-sectional view of section III, as shown in FIG. 1, illustrating an embodiment of the texture coating of the present invention, comprising resin particles within a medium.
Figure 3B:
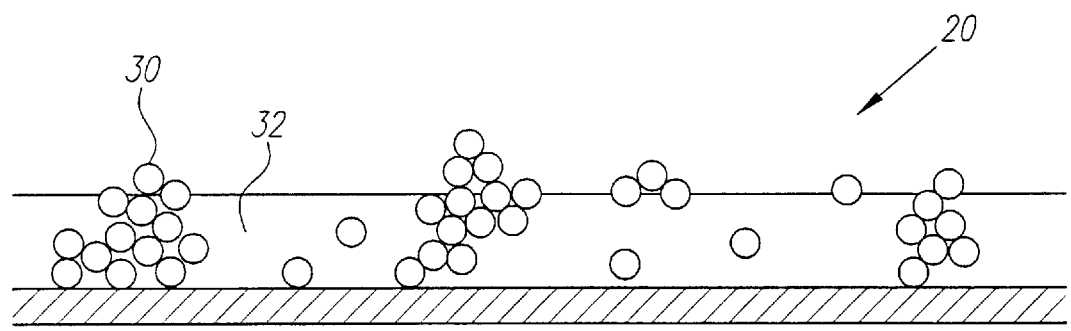
FIG. 3B is an alternative embodiment of FIG. 3A, showing agglomerated resin particles within the medium of the present invention.
Figure 3C:
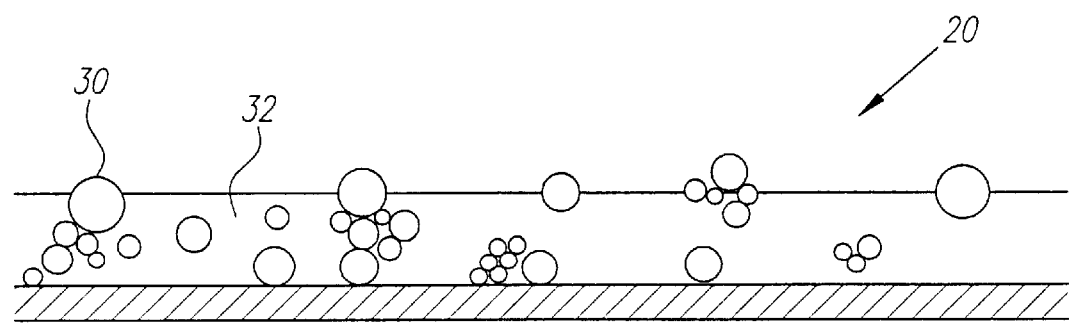
FIG. 3C is another alternative embodiment of FIG. 3A, showing agglomerated dissimilar size resin particles within the medium of the present invention.

FIGS. 3A–C represent various embodiments of the texture coating 20, as shown in cross-section of an area III in FIG. 1. The texture coating 20 comprises a number of resin particles 30, a medium 32 and a coupling agent (not shown). The resin particles 30 can be thermoset or thermoplastic resins, and in a preferred embodiment selected from olefins, fluoropolymers, polyamides and polyamines, in a most preferred embodiment selected from polyethylene or polypropylene. Although pictorially represented as spherical, the resin particles 30 can be selected from several shapes with smooth surfaces preferred to assist in uniform distribution throughout the medium 32. Any numbers of conventional methods can be used to apply the texture coating 20; such as brushing, spraying, electrostatic methods, powder coating and two component systems.

Characteristics of medium 32 include an ability to mix with the resin particles 30 and bond to structural material of the club head 10, followed by drying to a solid coating. Suitable material choices for the medium 32 include aqueous or organic solutions or suspensions, liquid adhesives and paints. In a preferred embodiment the medium 32 comprises a paint capable of binding the resin particles 30 and adhering to the surface of the club head 10, with the resin particles 30 forming up to 20% by volume of the coating 20. In a most preferred embodiment the resin particles 30 form 5% to 10% by volume of the texture coating 20. An alternative embodiment includes one or more coatings, with the medium 32 being transparent in the texture coating 20 forming a topmost coating.

The coupling agent serves to alter the surface chemistry of the resin particles 30 and the medium 32, thus promoting improved bonding both within the texture coating 20, and to the surface of the golf club head 10. Preferred embodiments of the coupling agent include silanes and inorganic acids such as phosphoric acid, with a most preferred embodiment being Silane 187A from Shell Chemical Co.

Figure 4:
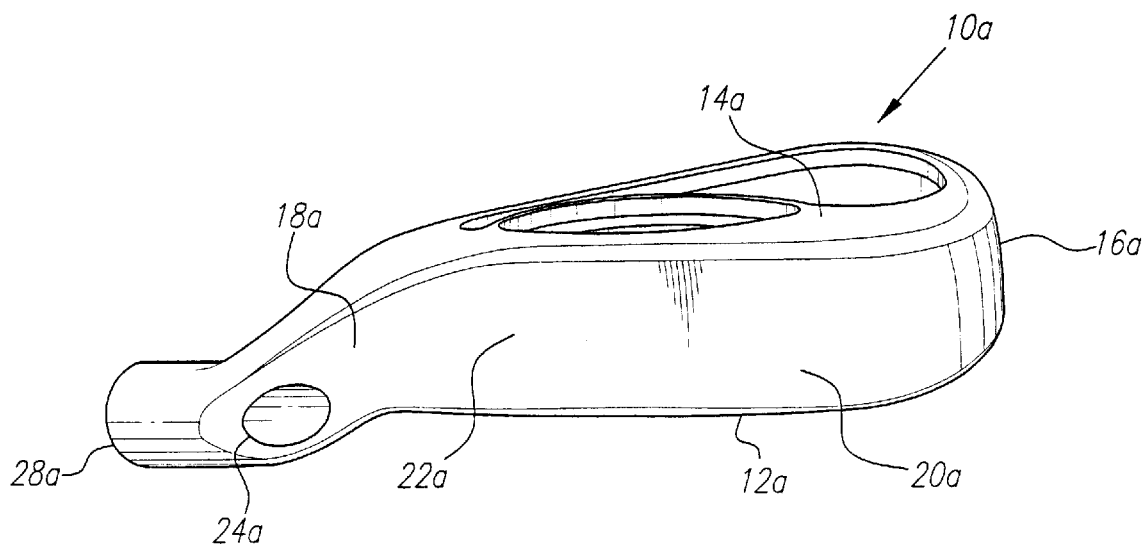
FIG. 4 is a bottom view of an iron golf club head showing an embodiment of the texture coating of the present invention.
Figure 5:
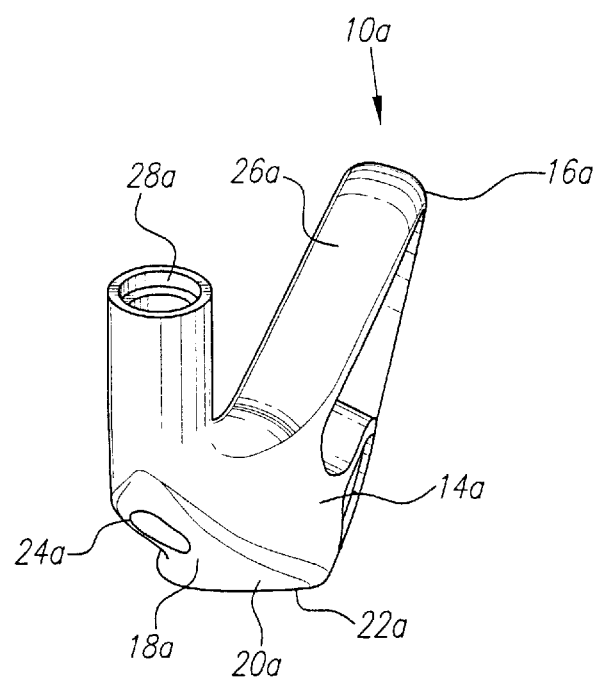
FIG. 5 is a heel view of an iron golf club head showing the texture coating of the present invention.

FIGS. 4 and 5 illustrates an iron-type golf club head 10a of the present invention with element numbers corresponding to those of FIGS. 1 and 2. A texture coating 20a is depicted on a bottom region 22a, but may occupy any number of surfaces on the iron-type golf club head 10a.

Figure 6:
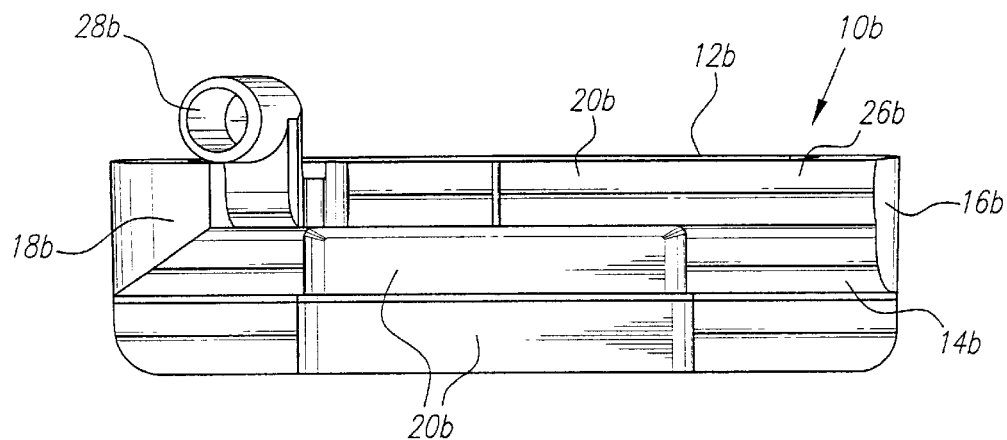
FIG. 6 is a top view of a putter golf club head showing an embodiment of the texture coating of the present invention.
Figure 7:
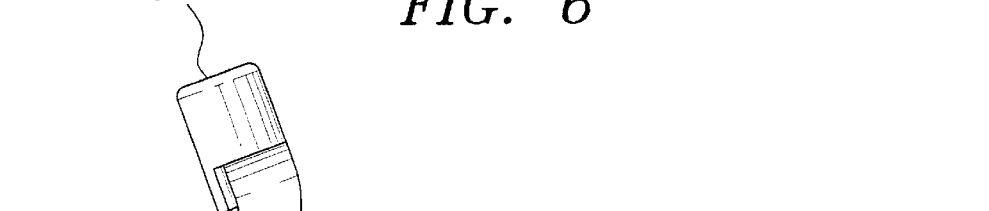
FIG. 7 is a rear view of the putter golf club head showing the texture coating of the present invention.
Figure 8:
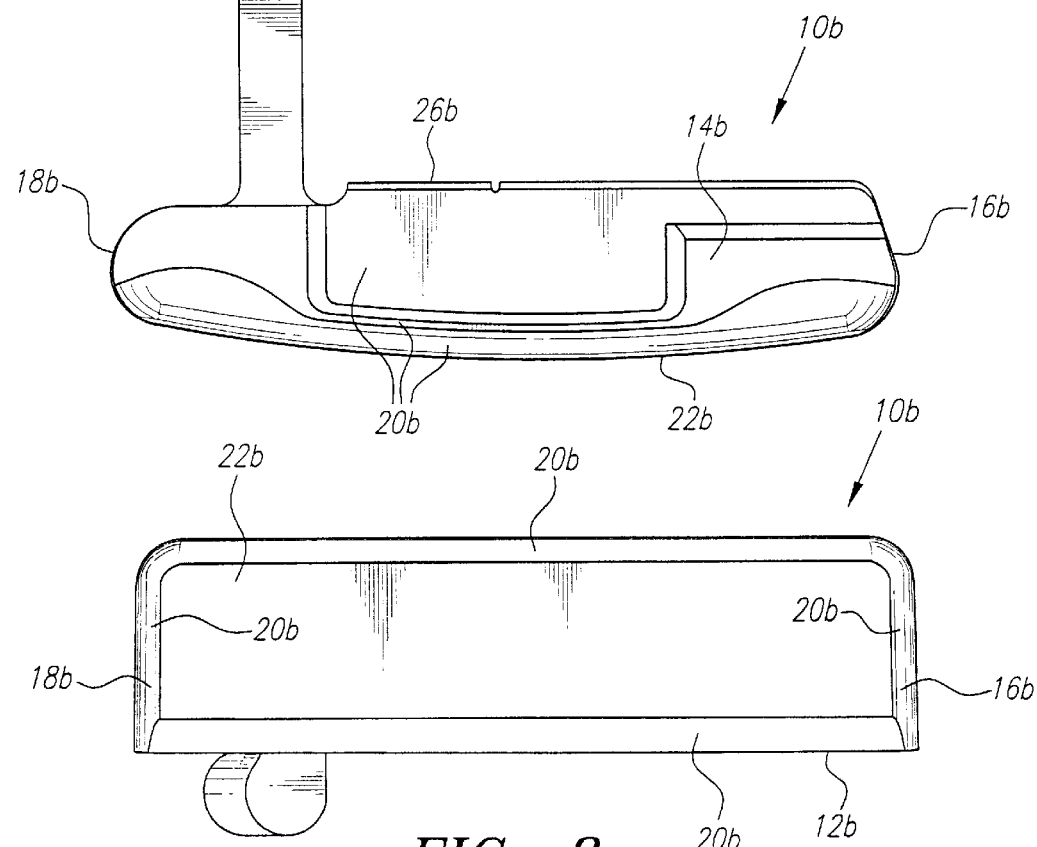
FIG. 8 is a bottom view of the putter golf club head showing the texture coating of the present invention.

FIGS. 6–8 represents a putter-type golf club head 10b of the present invention with element numbers corresponding to those of FIGS. 1 and 2. A texture coating 20b is depicted on a top, toe, heel and back regions, 26b, 16b, 18b and 14b respectively, but may applied on any number of surfaces of the putter-type golf club head 10b.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A wood-type golf club head comprising:
   a body comprising a top surface, a bottom surface, a face surface for striking a golf ball, a toe region and a heel region, wherein the body is composed of a metal; and
   a texture coating bonded to at least a portion of the bottom surface of the body, the texture coating comprising a plurality of resin particles with diameters ranging from 18 microns to 50 microns wherein the plurality of resin particles are either polyethylene particles or polypropylene particles, a silane coupling agent and a thermosetting urethane paint, wherein the plurality of resin particles ranges from 5% to 10% of the volume of the texture coating, the silane coupling agent ranges 0.01% to 2% of the volume of the texture coating, and the paint is at least 88% of the volume of the texture coating.

2. The wood-type golf club head according to claim 1 wherein the bottom surface comprises a first convex surface, a second convex surface located in the toe region, and a third convex surface in the heel region, wherein the texture coating is bonded to the second convex region and the third convex region.

3. A wood-type golf club head comprising:
   a body comprising a top surface, a bottom surface, a face surface for striking a golf ball, a toe region and a heel region, wherein the body is composed of a metal; and
   a texture coating bonded to the bottom surface of the body, the texture coating consisting of a plurality of resin particles with diameters ranging from 18 microns to 50 microns wherein the plurality of resin particles are either polyethylene particles or polypropylene particles, a silane coupling agent and a thermosetting paint, wherein the plurality of resin particles ranges from 5% to 10% of the volume of the texture coating, the silane coupling agent ranges 0.01% to 2% of the volume of the texture coating, and the paint is at least 88% of the volume of the texture coating.

\* \* \* \* \*